(12) United States Patent
Jalisatgi et al.

(10) Patent No.: US 11,307,843 B2
(45) Date of Patent: Apr. 19, 2022

(54) AUTOMATIC DEVICE-TO-DEVICE FIRMWARE UPGRADE OF A WIRELESS NETWORK

(71) Applicant: Carrier Corporation, Palm Beach Gardens, FL (US)

(72) Inventors: Akil Vivek Jalisatgi, Telangana (IN); Amit Basu, Telangana (IN); Krishnakanth Jarugumilli, Telangana (IN)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/049,106

(22) PCT Filed: Jun. 12, 2018

(86) PCT No.: PCT/US2018/037026
§ 371 (c)(1),
(2) Date: Oct. 20, 2020

(87) PCT Pub. No.: WO2019/203865
PCT Pub. Date: Oct. 24, 2019

(65) Prior Publication Data
US 2021/0240464 A1     Aug. 5, 2021

(30) Foreign Application Priority Data
Apr. 20, 2018   (IN) .............................. 201811015119

(51) Int. Cl.
*G06F 8/65*     (2018.01)
*G06F 8/60*     (2018.01)
(Continued)

(52) U.S. Cl.
CPC ................ *G06F 8/65* (2013.01); *H04L 67/34* (2013.01); *H04W 4/80* (2018.02)

(58) Field of Classification Search
CPC ............. G06F 8/65; H04L 67/34; H04W 4/80
See application file for complete search history.

(56) References Cited

U.S. PATENT DOCUMENTS

| | | | |
|---|---|---|---|
| 6,113,652 A | * | 9/2000 | Lysik .................. G06F 11/1433 717/170 |
| 7,509,121 B2 | | 3/2009 | Lin et al. |

(Continued)

FOREIGN PATENT DOCUMENTS

| | | |
|---|---|---|
| CN | 106023360 A | 10/2016 |
| CN | 107247589 A | 10/2017 |

(Continued)

OTHER PUBLICATIONS

International Search Report and Written Opinion for PCT Application No. PCT/US2018/037026, dated Dec. 19, 2018.

(Continued)

*Primary Examiner* — Daxin Wu
(74) *Attorney, Agent, or Firm* — Locke Lord LLP; Scott D. Wofsy; Judy R. Naamat

(57) ABSTRACT

A method is provided to automatically perform a firmware upgrade of a wireless network. The method includes receiving by a node of the wireless network using slave-mode, a firmware upgrade request from another node of the wireless network and performing by the node a firmware upgrade using upgrade instructions included with the firmware upgrade request. The method further includes determining by the node using master mode, at least two eligible nearby nodes of the wireless network, updating the firmware upgrade request, and transmitting by the node using master mode the firmware upgrade request to the at least two eligible nearby nodes of the network.

17 Claims, 3 Drawing Sheets

(51) Int. Cl.
*H04W 4/80* (2018.01)
*H04L 67/00* (2022.01)

(56) References Cited

U.S. PATENT DOCUMENTS

| | | | |
|---|---|---|---|
| 8,667,479 | B2 | 3/2014 | Johnsson et al. |
| 9,084,105 | B2* | 7/2015 | Luna .................... G06F 3/0605 |
| 9,112,891 | B2 | 8/2015 | Pathak |
| 9,406,180 | B2 | 8/2016 | Eberwine et al. |
| 9,420,065 | B2 | 8/2016 | Mayo et al. |
| 9,575,741 | B2 | 2/2017 | Chinnappan et al. |
| 9,740,472 | B1* | 8/2017 | Sohi .......................... G06F 8/65 |
| 2009/0217256 | A1 | 8/2009 | Kim |
| 2010/0008296 | A1* | 1/2010 | Kwon ................... H04W 8/005 370/328 |
| 2013/0107770 | A1* | 5/2013 | Marsden ............... H04W 84/20 370/310 |
| 2014/0068592 | A1 | 3/2014 | Chitre et al. |
| 2016/0036814 | A1 | 2/2016 | Conrad et al. |
| 2016/0284148 | A1 | 9/2016 | Almomani |
| 2016/0344830 | A1* | 11/2016 | Smith .................... H04W 4/80 |
| 2016/0364223 | A1 | 12/2016 | Vandikas et al. |
| 2018/0048987 | A1 | 2/2018 | Morris |

FOREIGN PATENT DOCUMENTS

| | | | | |
|---|---|---|---|---|
| WO | WO-2013066938 A1 * | 5/2013 | ............. | G06F 8/654 |
| WO | WO-2016036814 A1 | 3/2016 | | |
| WO | WO-2017019238 A1 * | 2/2017 | ............. | H04L 67/34 |

OTHER PUBLICATIONS

Prada-Delgado, M.A., et al., "Trustworthy Firmware Update for Internet-of-Thing Devices Using Physical Unclonable Functions"; Instituto de Microelectrónica de Sevilla, IMSE, CNM, Universidad de Sevilla, CSIC, Seville, Spain; 2017; http://ieeexplore.ieee.org/document/8016282/.

* cited by examiner

AUTOMATIC DEVICE-TO-DEVICE FIRMWARE UPGRADE OF A WIRELESS NETWORK

This Application is a 371 U.S. National Phase of International PCT Patent Application No. PCT/US2018/037026 filed on Jun. 12, 2018, which claims priority from Indian Patent Application No. IN201811015119 filed on Apr. 20, 2018. The entire contents of these applications are incorporated herein by reference in their entirety.

BACKGROUND OF THE DISCLOSURE

1. Field of the Invention

The present disclosure relates to the art of computing, and more particularly to device-to-device firmware upgrade of a wireless network.

2. Description of Related Art

The task of implementing a firmware upgrade of each smart device of a large number of smart devices can be time consuming and manually intensive. As an example, the smart devices can be smart electronic locks that each control entry to a designated physical area. In certain environments, such as a hotel, apartment building, locker room, long-term storage facility, many electronic locks can be deployed physically near one another. For example, in a hotel setting, the hotel can have over one hundred rooms, with each room secured by an electronic lock. The smart devices may be wireless devices that communicate with other devices using Bluetooth™ communication, or an equivalent.

Bluetooth is a popular wireless communication protocol for transmitting data over short distances. Bluetooth is commonly used with today's mobile electronic devices, connecting devices such as headphones, headsets, watches, keyboard, mice, mobile phones, tablets, and sporting equipment. The above-described devices have a one-to-one connection. Bluetooth can also be used to form a personal area network (PAN) that includes several Bluetooth enabled devices.

In some scenarios, such as for electronic locks in a hotel setting, security is a high priority. A firmware upgrade using a PAN may provide greater security when compared to broadcasting a firmware upgrade over a wider area network (WAN), such as Wi-Fi. In an example PAN, a Bluetooth capable upgrade device is moved into a position near one smart device or a batch of smart devices to perform the firmware upgrade. In this way, the smart devices can be upgraded one at a time or in batches of smart devices that are positioned physically close to the upgrade device. The upgrade device can also obtain acknowledgements that indicate whether the upgrade was successful. The upgrade device can then be moved and repositioned to perform the upgrade on each smart device or batch of smart devices until the upgrade is completed on all of the smart devices.

While conventional methods and systems have generally been considered satisfactory for their intended purpose, there is still a need in the art for an automatic and efficient method to perform an efficient firmware upgrade on a plurality of smart devices and obtain an acknowledgement that each upgrade was successful.

SUMMARY OF THE INVENTION

In accordance with an aspect of the disclosure, a method is provided to automatically perform a firmware upgrade of a wireless network. The method includes receiving, by a node of the wireless network using slave-mode, a firmware upgrade request from another node of the wireless network and performing, by the node, a firmware upgrade using upgrade instructions included with the firmware upgrade request. The method further includes determining by the node using master mode, at least two eligible nearby nodes of the wireless network, updating the firmware upgrade request, and transmitting, by the node using master mode, the firmware upgrade request to the at least two eligible nearby nodes of the network.

In embodiments, the update request received can include a routing list of nodes that transmitted the update request, including the other node as the most recent node to transmit the update request. Updating the update request can include the node adding identification of the other node to the routing list as the most recent node to transmit the update request. The method can further include transmitting a status packet that indicates status of the firmware upgrade performed to the most recent node of the routing list as received. The transmitting node uses slave mode and can be performed after performance of the firmware upgrade.

In another embodiment, the update request received can include a routing list of nodes that transmitted the update request, including the other node as the most recent node to transmit the update request. Updating the update request can include the node adding identification of the node to the routing list as the most recent node to transmit the update request. The method can further include receiving, using master mode, a status packet from the at least two eligible nearby nodes to which the upgrade request was transmitted. The status packet can indicate status of a firmware upgrade by the at least two eligible nearby nodes. The method can further include transmitting, using master mode, the received status packet to the most recent node of the routing list as received.

In further embodiments, determining the at least two eligible nearby nodes can include determining eligibility by querying the at least two eligible nearby nodes regarding a current firmware version being used. Eligibility can be based on whether the queried nodes are currently using a firmware version that is not yet updated relative to a version provided by the update request.

In addition, in embodiments, the method further includes receiving a second status packet from one of the at least two eligible nearby nodes. The second status packet was received by the one of the at least two eligible nearby nodes from a second other node of the network that is different than the node and the other node. The second status packet can indicate status of the firmware upgrade by the second other node in response to receiving an upgrade request from the one of the at least two eligible nearby nodes. The method can further include transmitting the received second status packet to the most recent node of the routing list as received.

Furthermore, in embodiments, the method further includes storing, by the other node, a master list of unique identifiers for each node of the network to be provided with the upgrade request for performing the firmware upgrade as instructed in the upgrade request. The other node can receive status packets from each node that transmitted the upgrade request. The respective status packets can indicate status of the firmware upgrade requested to be performed by the respective upgrade requests that were transmitted. The method can further include updating, by the other node, the master list to reflect current status of the firmware upgrade for each of the unique identifiers based on the status packets received.

In embodiments, the update request can include the routing list as updated by the transmitting node. The method can further includes each receiving node that receives the update request from a transmitting node performing the firmware upgrade using the upgrade instructions in the firmware upgrade request, determining using master mode, eligible nearby nodes of the wireless network, updating the firmware upgrade request by adding identification of the receiving node to the routing list as the most recent transmitting node, and transmitting using slave mode, to the most recent node of the routing list as received, a status packet that indicates status of the receiving node's firmware upgrade. The method can further include the receiving node transmitting using master mode the firmware upgrade request to the eligible nearby nodes, receiving using master mode a status packet from each of the eligible nodes that indicates status of the firmware upgrade of the eligible nearby nodes. The method can further include the receiving node transmitting using master mode, to the most recent node of the routing list as received and after performance of the firmware upgrade, the status packet received from each of the eligible nodes. The method can further include the receiving node, upon receiving via any of the eligible nodes a status packet that indicates status of a firmware upgrade by the one or more remote nodes, transmitting, using master mode, the status packet received from the one or more remote nodes to the most recent node of the routing list as received. The status packet received by the receiving node may have been transmitted from one or more remote nodes to which the upgrade request was previously transmitted by the eligible nearby nodes.

In another embodiment, in the event that transmitting the firmware upgrade request to the at least two eligible nearby nodes of the network by the node is unsuccessful after retrying a threshold number of times, the node can transmit the status packet to the most recent node of the routing list as received to indicate that the firmware upgrade was unsuccessfully transmitted.

In further embodiments, the node can communicate with the other node via a first piconet and the node can further communicate with the at least two eligible nearby nodes via a second piconet different than the first piconet.

In addition, in embodiments, determining the at least two eligible nearby nodes can include detecting at least one nearby node that is capable of two-way wireless communication with the node, storing the detected at least one nearby node in a target list, and selecting nodes included in the target list that are eligible for the firmware upgrade based on a current upgrade status of the nodes included in the target list.

In accordance with another aspect of the disclosure, a node of a wireless system is provided. The node includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

As described above, Bluetooth is a wireless protocol commonly used to couple electronic devices together. These electronic devices commonly are mobile devices and/or use batteries to power the Bluetooth connectivity. While some embodiments are described herein with respect to Bluetooth, it should be understood that embodiments can be used with any type of wireless messaging protocol, such as WiFi, Zigbee, Z-Wave, or any wireless protocol currently in existence or developed in the future.

Figure 1:
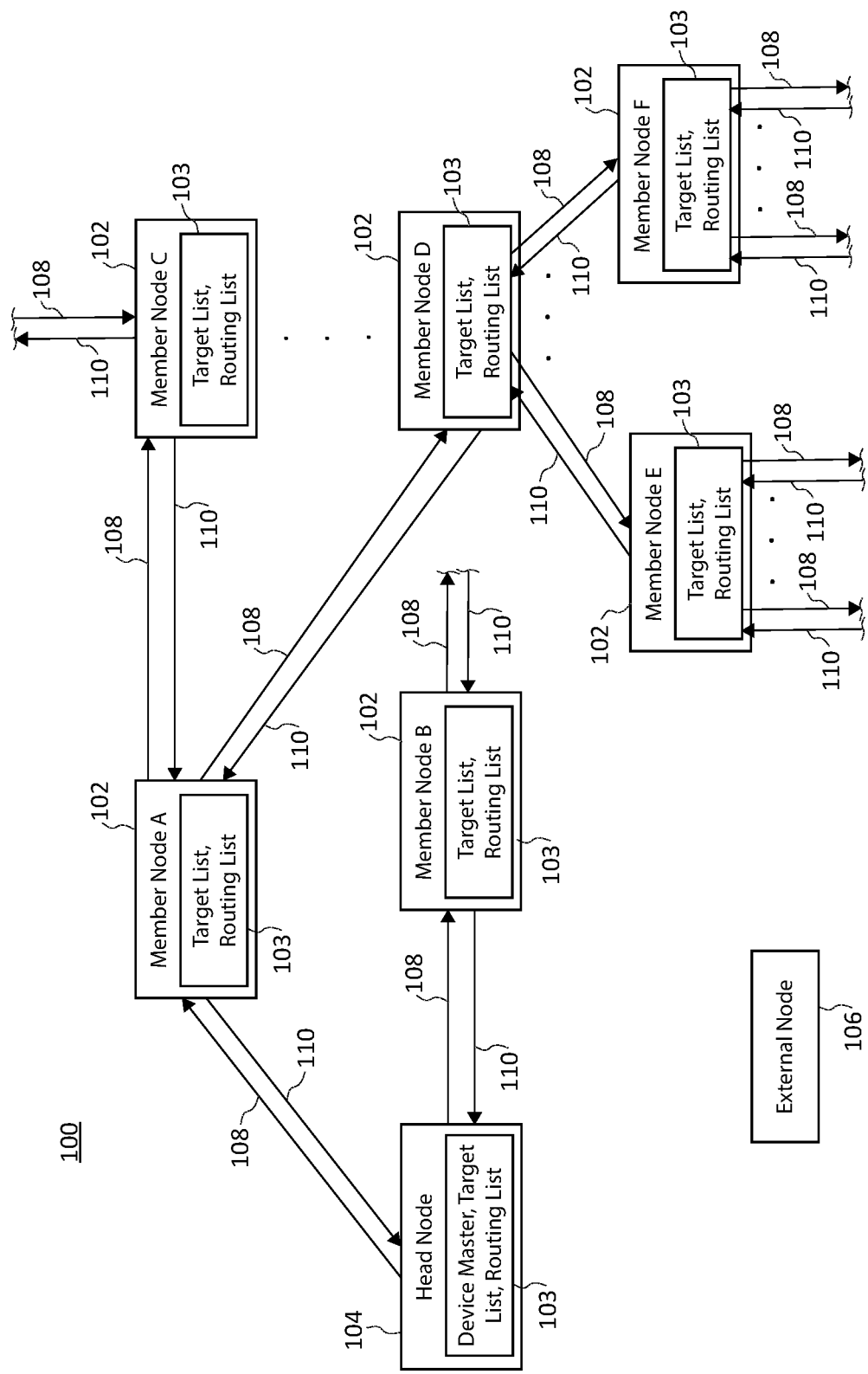
FIG. 1 shows a schematic diagram of an exemplary embodiment of wireless network in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of a wireless network in accordance with the disclosure is shown in FIG. 1 and is designated generally by reference character 100. Other embodiments of a wireless network in accordance with the disclosure, or aspects thereof, are provided in FIGS. 2-3, as will be described.

Network 100 includes a plurality of nodes 101. Nodes 101 include member nodes (MN) 102 (also referred to as member nodes A-F) and head node (HN) 104. An external node 106 is not a member of the network 100, and therefore is not eligible for communicating with nodes 101. When needed, each of member nodes A-F and the head node 104 can function using a slave mode for receiving and performing a firmware upgrade, a master mode for requesting performance of the firmware upgrade to another member node 102 and obtaining a status packet (SP) from that member node 102 that indicates the status of the firmware upgrade, and a routing mode for routing status packets from remote nodes (RMs) to the master node 104. The status packet can include, for example, an ACK signal or a NACK signal. When functioning using the master mode, the head node 104 can request performance of the firmware upgrade. The head node 104 can additionally maintain a master list of unique identifiers for all of the member nodes 102 and associated update information about the respective member nodes 102.

Each node 101 stores a target list and a routing list in a storage device 103. The target list is a list of detected nearby nodes. The routing list shows routing information about the route that a message traveled to arrive at its current position.

All of the nodes 101 can communicate with at least one other node 101 that is included in the network 100 and is nearby. For example, when using Bluetooth low energy (BLE) as the wireless messaging protocol, the nodes 101 can communicate with one another based on each node's general attribute (GATT) profile and usage of the BLE service. A nearby node is a node 101 that is within a scanning range of another node 101, meaning the two nodes are within a distance relative to one another that allows for point-point communication between the two nodes. A node 101 can use a received signal strength indicator (RSSI) of other sensed nodes 101. If the RSSI strength of a sensed node 101 is above a configurable threshold (e.g., more than −70 db), the sensed node 101 can be considered a nearby node. Each of the nodes 101 can be considered a "peer." Thus, the network 100 can be considered a peer-to-peer network.

The communications between the nodes are indicated by signals sent along path 108 by a node 101 operating in master mode (also referred to as a master node) to a node 101 operating in slave mode (also referred to as a slave node). These are also respectively referred to, from the master node's perspective, as outgoing signals sent along path 108 and incoming signals sent along path 110.

Each node 101, when operating in the master mode, can detect nearby nodes by scanning and determining which nodes have a signal strength that is acceptable. The detected nearby nodes are added to the target list maintained by that master node. The nodes 101 can perform a reset process that causes them to erase their own target list, detect the nearby nodes anew, and generate a new target list. A reset process can be triggered, for example, by a reset instruction message from the head node 104 or at regular intervals. The reset process can be performed more frequently when the nodes 101 are mobile devices. The head node 104 can generate a reset instruction message, for example, each time a node 101, is added to, removed from, moves within the network 100, or fails.

The terms "data," "information," and "message" are used interchangeably herein but essentially mean the same thing, however more specifically a message contains data that encodes information. The message is transferable from one node 101 to another. The data can be processed by a receiving node 101 to determine the information. In addition to a message containing data, the message may include priority information, message integrity information, a routing list, or other information typically transferred in a digital message. The routing list can be configured as a linked list of nodes 101 that transmitted the message, showing routing information about the route that the message traveled to arrive at its current position. In embodiments, the linked list can be configured as a last-in-first-out (LIFO) stack, also referred to as a stack list. Additionally, data contained in messages may be encrypted using various methods well known in the art of message delivery.

The head node 104 can be any type of device that is used to communicate with each of nodes 101. In some embodiments, the head node 104 can include database capabilities in order to store data transmitted by nodes 101. In some embodiments, the head node 104 can include programming capabilities such that head node 104 can produce instructions for any one of nodes 101. Head node 104 can be embodied as a laptop computer, a desktop computer, a server, a cloud, a mobile electronic device, or any other type of computing device. Head node 104 can also have communication capabilities for communicating with other networks and/or with other devices external to the network 100.

In the example provided, member nodes 102 are described as door locks, however member nodes 102 can be embodied as one or more types of devices enabled for wireless communication, such as sensors, lights, smart phones, appliances, vehicles, etc. The nodes 101 can have a second communication function, such as to communicate with a mobile device that is not included in the network 100. The second communication can use Bluetooth protocol or a different communication protocol, and can be independent of the network communication. For example, each member node 102 can be a lock of a door (also referred to as a door lock), and the mobile device can be a mobile phone that is authorized to open a particular door lock.

Before an update process is performed, the head node 104 and each member node 102 performs a discovery process to discover nearby nodes and store unique IDs (e.g., without limitation, MAC address) of the nearby nodes in a target list. As described above, nearby nodes are included in the network and have a signal strength that satisfies predetermined criteria. Each of the head node 104 and the member nodes 102 stores its own target list. The head node 104 further stores the device master and a target list of eligible nearby nodes 102. The device master tracks and stores the status of each member node 102.

Furthermore, before the head node 104 sends an update request (UR) to a member node 102, or a member node 102 forwards an update request to another member node 102, a version check can be performed to determine which nodes in the target list are eligible for the update. The version check can include sending a query to the member nodes 102 included in the target list of the node 101 performing the version check. The query asks which version firmware is being used. Each node 101 that receives the query responds with the version it is using. The node 101 performing the version check can determine if the nodes 102 that replied have already performed the update process. Depending on the result of the version check query, the nodes 102 listed in its target list that have not yet performed the update process (i.e., passed the version check) are selected as eligible nearby nodes to receive the update request.

The head node 104 can send the update request to all of the eligible nearby nodes on its target list that passed the version check. As for the member nodes 102, the number of member nodes 102 to which the update request can be forwarded may be limited by the protocol used. For example, when using BLE protocol, the member node 102 that forwards an update request received from the head node 104 to nearby eligible member nodes 102 is limited to sending up to seven update requests.

As illustrated in FIG. 1, each member node 102 that receives an update request forwards the update request to the nearby eligible member nodes 102 on its target list, which is limited to seven nodes when using BLE protocol. Furthermore, each member node 102 that received a forwarded update request forwards the update request to the nearby eligible member nodes 102 on its target list. Thus, the member node 102 that receives an update request and forwards it is acting as a repeater. This process can continue iteratively from repeater to repeater. Furthermore, the number of member nodes 102 that receive the forwarded update request can increase exponentially with each iteration. Thus, in embodiments, the member nodes of an entire network 100 can automatically receive update requests and perform the actual update.

First and second piconets 120 and 130 are shown. A piconet is a small network of devices within network 100 connected using a wireless protocol, such as BLE protocol. When using BLE, the size of a piconet can range from two to eight connected nodes. In an established piconet, one node uses master mode while all the other nodes use slave mode. A node that is not included in a piconet is a remote node relative to the piconet. The piconets in which member node A is included are shown as piconets 120 and 130, with remote nodes E and F being member nodes 102 that are remote relative to member node A, because they are not included in any of the piconets 120, 130 to which member node A belongs. Remote nodes E, F are not nearby nodes relative to member node A.

In piconet 120, the head node 104 uses master mode, and member nodes A through B use the slave mode. As indicated by the ellipse " . . . ," up to seven nodes (when using BLE) using slave mode could be included in piconet 120. In piconet 130, member node A uses the master mode and member nodes C-D use the slave mode. As indicated by the ellipse " . . . ," up to seven nodes (when using BLE) using slave mode could be included in piconet 130. Although not shown, each of nodes B and C can use master mode and send the update request to nearby eligible nodes, which would be up to seven nodes using slave mode (when using BLE). Node D is shown using master mode and sending the update request to up to seven (when using BLE) nearby eligible nodes E-F that are using slave mode. Furthermore, each of nodes E-F can use master mode and send the update request to nearby eligible nodes, which would be up to seven nodes using slave mode (when using BLE). Thus, once the head node 104 submits an update request to its nearby eligible nodes, the number of nodes 102 that can receive the update request can automatically increase exponentially without intervention by another human or processing device.

Figure 2:
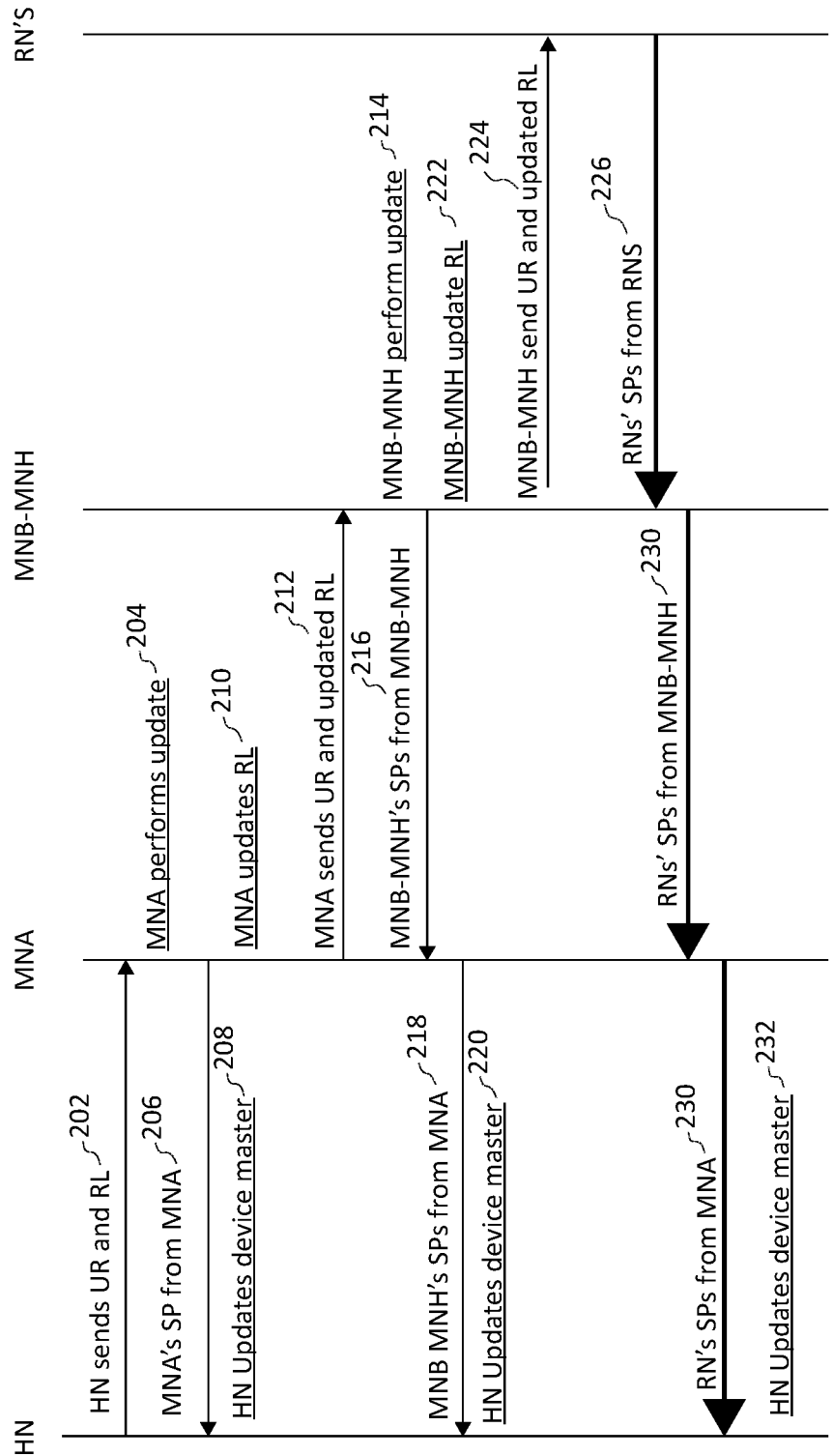
FIG. 2 is a flow diagram showing example operations performed by the nodes of a wireless network for propagating a firmware upgrade through the network in accordance with embodiments of the present disclosure.

FIG. 2 shows a flow diagram 200 that illustrates an example method of an automatic update process. It is noted that certain operations can be substituted or performed in separate software or firmware modules of the respective nodes. FIG. 2 shows a flowchart 200 of example operations performed by the nodes of a network, such as nodes 101 of network 100 shown in FIG. 1 in accordance with a wireless communication used by the respective nodes, such as BTE protocol.

It is noted that in embodiments, the order of operations shown in FIG. 2 is not required, so in principle, the various operations may be performed out of the illustrated order or in parallel. Also, in embodiments, certain operations may be skipped, different operations may be added or substituted, or selected operations or groups of operations may be performed in a separate application following the embodiments described herein.

The flow diagram 200 presupposes that the head node 104 and the member nodes 102 have each formed its target list and selected the eligible nearby nodes before each transmission. It is also understood, even if not stated, that the head node 104 updates its device master each time it receives a reply packet.

At operation 202, a head node, such as head node 104 shown in FIG. 1, sends an upgrade request with the routing list to several eligible nearby nodes. FIG. 2 shows a member node A (MNA), such as one of member nodes 102 shown in FIG. 1, receiving the upgrade request and routing list sent by the head node 104 and storing the routing list received from the head node. It can be understood that several other member nodes that are eligible nearby nodes received the upgrade request and routing list as well.

At operation 204, MNA performs an upgrade based on instructions provided by the upgrade request. At operation 206, MNA sends a status packet upstream to the head node to indicate that it successfully completed the upgrade as instructed. MNA uses the routing list it stored each time its sends a status packet upstream to the head node. The routing list stored is the routing list that it received from the upstream node, which in this case is the head node. The status packet can indicate, for example, the ID of the device and an associated status, such as any of upgraded, not upgraded, not reachable, and upgrade failed. The status packet can further indicate a timestamp at which the upgrade was performed, attempted, or determined to be unreachable. In operations 202 and 206, the head node uses master mode and MNA uses slave mode.

At operation 208, the head node updates the device master to indicate that node MNA performed the upgrade. The device master can be updated with all of the information provided by the status packet. At operation 210, MNA updates the routing list by adding its unique ID to the top of the stack, the stack operating as a LIFO stack. The MNA does not store the updated routing list other than for transmitting it to the next node(s).

At operation 212, the MNA transmits the update request and the updated routing list to its eligible nearby nodes that it determined. MNA can store its target list and/or the eligible nearby nodes for reuse when forwarding a next update request, or perform the version check and/or establish the target list when triggered, periodically, and/or each time it forwards an update request. In the example shown, MNA transmits to eligible nearby nodes MNB-MNH, which is the maximum seven nodes to which it is capable of transmitting a repeated transmission when using BLE protocol. At operation 214, nodes MNB-MNH each perform an upgrade based on instructions provided by the upgrade request.

At operation 216 the MNA receives a status packet from each of the eligible nearby nodes to which it had transmitted. In the event that a status packet is not received from any of nodes MNB-MNH, MNA can wait and retransmit its transmission. This can be repeated a threshold number of times. If a status packet is still not received from any of nodes MNB-MNH, it will indicate in the status packet that it sends upstream to the head node that the status is "unreachable." Each of the steps performed by nodes MNB-MNH are not shown. It is understood that each of the nodes MNB-MNH store the routing list received from the upstream node, which in this case is MNA. The ID at the top of the routing list is MNA. Thus, when any of packets MNB-MNH send a status packet to the upstream node, they use the ID at the top of the stack, which is the ID of the upstream node from which they received the routing list, which in this case is MNA. In operations 212 and 216, MNA uses master mode and MNB-MNH use slave mode.

At operation 218, the MNA, using routing mode, transmits the status packets received from nodes MNB-MNH to the head node using the ID at the top of its stored routing list, which in this case is the head node. At operation 220, the head node updates the device master with the information provided in the status packets received from nodes MNB-MNH.

At operation 222, each of nodes MNB-MNH perform the update per the upgrade information in the update request, stores the routing list received form MNA. At operation 222, each of nodes MNB-MNH updates the routing list it received from MNA by adding its own ID to the top of the stack. At operation 224, each of nodes MNB-MNH transmits the upgrade request to its eligible nearby nodes. The eligible nearby nodes of nodes MNB-MNH, also referred to as remote nodes, are remote from node MNA, as they are out of communication range with node MNA. This bundle of tasks performed by the remote nodes is indicated by the box and arrow labeled "process the status request."

At operation 226, the remote nodes send status packets to the node of nodes MNB-MNH from which they received the update request. Each remote node sends its status packets to the top ID on its routing lists, which is the upstream node of nodes MNB-MNH from which it received the update request. Since this can be many status packets, up to 49 when using BTE protocol, the arrow is shown as a thick line. In operations 224 and 226, the nodes MNB-MNH use master mode and the remote nodes use slave mode.

At operation 228, nodes MNB-MNH, using routing mode, send the status packets that were originally sent by the remote nodes to node MNA. Each node MNB-MNH sends these status packets to the top ID on its routing list, which is the upstream node MNA. At operation 230, node MNA, using routing mode, sends the status packets that were originally sent by the remote nodes to the head node. Node MNA sends to the top ID on its routing list, which is the head node. At operation 232, the head node updates the device master with the status indicated by each of the received status packets that originated from the remote notes.

In embodiments, the number of update requests and status packets sent increases exponentially at each iteration, which is indicated by an increase of thickness of the arrows representing transmission of the update requests and status packets. The thickness is not necessarily increased to scale, but is rather provided to indicate the increase in quantity of messages sent.

The head node initiates an update process for a particular firmware update. When beginning an update process, the head node 104 generates and stores a routing list for each update request that it sends. The routing list at this stage of the update process is the unique identification (ID) of the head node 104, which can be, for example and without limitation, its MAC address.

In embodiments in which the member nodes 102 are door locks, such as door locks in a hospitality entity (such as a hotel, motel, or resort), one or more of the disclosed embodiments can be used to maintain the door locks of the hospitality entity. In such an embodiment, each of the member nodes 102 described above is a door lock and the head node 104 is a computer system that is accessible by a variety of hotel employees, such as for managing reservations, the front desk, housekeeping, and security.

The member nodes 102 execute firmware to perform various functions that can include interacting with the head node 104, interacting with a mobile or stationary device not included in network 100, and/or interacting with other member nodes 102. The firmware may need to be updated, such as to change functionality, to ensure compatibility with the head node 104 (which may be changed or undergo a configuration update itself), and/or to ensure compatibility with devices that are external to the network 100 with which it interacts. Under certain circumstances, privacy and security of the firmware update may be a high priority. Under such circumstances, an upgrade broadcast over a WAN, such as WiFi, may be discouraged. Transporting or maneuvering a portable upgrade device that has Bluetooth capability for communicating with the door locks can be a slow and impracticable solution. For example, the update process may need to be performed at inconvenient hours when guests are not bound to be in the hallways. When there are a large number of locks, for example 100 locks, using a conventional solution 100 firmware upgrades would need to be performed manually. Using the disclosed solution, one lock upgrade can be performed manually, after which the other locks are upgraded automatically in an exponential chain, thereby increasing scalability and overall duration of mass upgrade.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the nodes 101 shown in FIG. 1 may be implemented or executed by one or more computer systems. For example, the nodes 101 of network 100, e.g., the head node 104 or member nodes 102, can be implemented using a computer system such as example computer system 302 illustrated in FIG. 3. In various embodiments, computer system 302 may be a stationary or mobile electronic device and/or include one or more of a field-programmable gate array (FPGA), application specific integrated circuit (ASIC), microcontroller, microprocessor, or the like.

Computer system 302 is only one example of a suitable system and is not intended to suggest any limitation as to the scope of use or functionality of embodiments of the disclosure described herein. Regardless, computer system 302 is capable of being implemented and/or performing any of the functionality set forth hereinabove.

Computer system 302 may be described in the general context of computer system-executable instructions, such as program modules, being executed by a computer system. Generally, program modules may include routines, programs, objects, components, logic, data structures, and so on that perform particular tasks or implement particular abstract data types. Computer system 302 may be practiced in distributed data processing environments where tasks are performed by remote processing devices that are linked through a communications network. In a distributed data processing environment, program modules may be located in both local and remote computer system storage media including memory storage devices.

Figure 3:
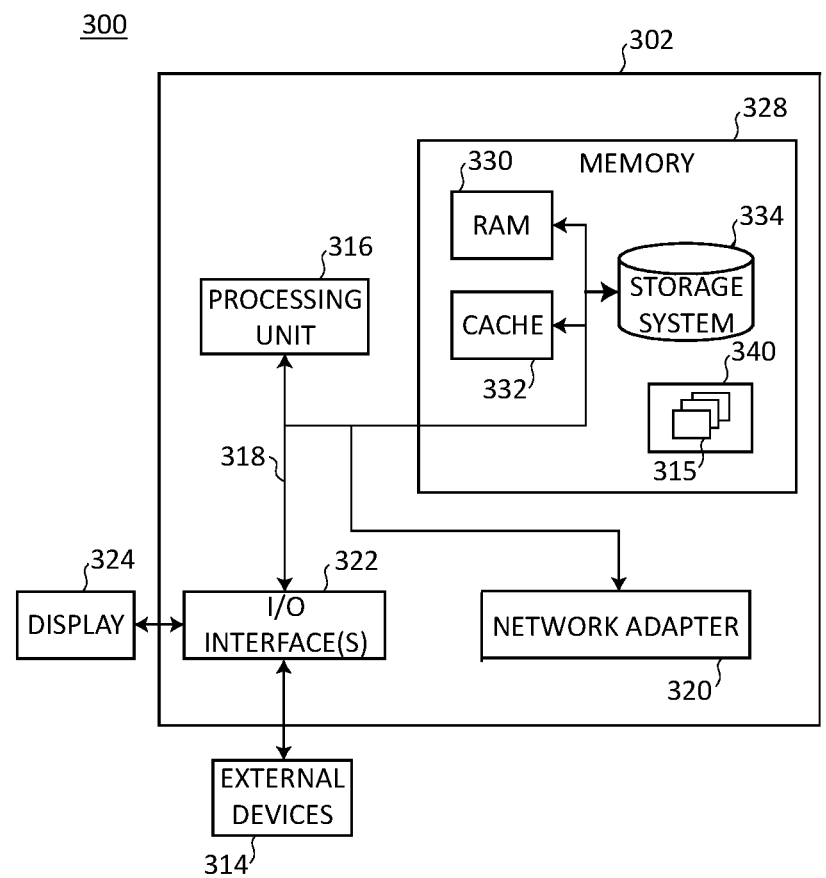
FIG. 3 illustrates a schematic block diagram of an example computer system that implements nodes of the wireless network shown in FIG. 1 in accordance with an illustrative embodiment of the present disclosure.

Computer system 302 is shown in FIG. 3 in the form of a general-purpose computing device. The components of computer system 302 may include, but are not limited to, one or more processors or processing units 316, a system memory 328, and a bus 318 that couples various system components including system memory 328 to processor 316.

Computer system 302 typically includes a variety of computer system readable media. Such media may be any available media that is accessible by the nodes 101, and it includes both volatile and non-volatile media, removable and non-removable media.

System memory 328 can include computer system readable media in the form of volatile memory, such as random access memory (RAM) 330 and/or cache memory 332. Computer system 302 may further include other removable/non-removable, volatile/non-volatile computer system storage media. By way of example only, storage system 334 can be provided for reading from and writing to a non-removable, non-volatile magnetic media. Each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 315, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 315 generally carry out the functions and/or methodologies of embodiments of the disclosure as described herein.

Computer system 302 may also communicate with one or more external devices 314, e.g., a mobile device. Such communication can occur via Input/Output (I/O) interfaces 322, such as a Bluetooth interface. Still yet, computer system 302 can communicate with one or more networks such as a local area network (LAN), a general wide area network (WAN), and/or a public network (e.g., the Internet) via network adapter 320. As depicted, network adapter 320 communicates with the other components of computer system 702 via bus 318. It should be understood that although not shown, other hardware and/or software components could be used in conjunction with computer system 302.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the network 100 as disclosed include that in embodiments, the head node can transmit an update request to its nearby eligible nodes, and automatically, the update request can be propagated to the nearby eligible nodes of each node that receives the update request. In embodiments, each node that receives the update request can automatically sends a status packet back to the head node. In embodiments, each status packet is routed back to the head node through the same route the status packet traversed to that node. The head node can update a device master to track which nodes were successfully updated.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method to automatically perform a firmware upgrade of a wireless network, the method comprising:
    receiving by a node of the wireless network using slave-mode, a firmware upgrade request from another node of the wireless network, wherein the firmware upgrade request received includes a routing list of nodes that transmitted the firmware upgrade request, including the other node as the most recent node to transmit the firmware upgrade request;
    performing by the node a firmware upgrade using upgrade instructions included with the firmware upgrade request;
    determining by the node using master mode, at least two eligible nearby nodes of the wireless network;
    updating the firmware upgrade request to include the node adding identification of the other node to the routing list as the most recent node to transmit the firmware upgrade grade request;
    transmitting by the node using master mode, the firmware upgrade request to the at least two eligible nearby nodes of the wireless network;
    each receiving node of the wireless network that receives the firmware upgrade request from a transmitting node of the wireless network:
        performing the firmware upgrade using the upgrade instructions in the firmware upgrade request;
        determining using master mode, second eligible nearby nodes of the wireless network;

updating the firmware upgrade request by adding identification of the receiving node to the routing list as the most recent transmitting node;
transmitting using slave mode, to the most recent node of the routing list as received, a status packet that indicates status of the receiving node's firmware upgrade performed;
transmitting using master mode, the firmware upgrade request to the second eligible nearby nodes;
receiving using master mode, a status packet from each of the second eligible nearby nodes that indicates status of the firmware upgrade of the second eligible nearby nodes;
transmitting using master mode, to the most recent node of the routing list as received, after performance of the firmware upgrade, the status packet received from each of the second eligible nearby nodes; and
upon receiving, via any of the second eligible nearby nodes, a status packet transmitted from one or more remote nodes to which the firmware upgrade request was previously transmitted by the at least two eligible nearby nodes that indicates status of a firmware upgrade by the one or more remote nodes, transmitting, using master mode, the status packet received from the one or more remote nodes to the most recent node of the routing list as received.

2. The method of claim 1, wherein the firmware upgrade request received includes a routing list of nodes that transmitted the firmware upgrade request, including the other node as the most recent node to transmit the firmware upgrade request, and firmware upgrade updating the firmware upgrade request includes the node adding identification of the node to the routing list as the most recent node to transmit the firmware upgrade request, wherein the method further comprises:
receiving, using master mode, a status packet from the at least two eligible nearby nodes to which the firmware upgrade request was transmitted, the status packet indicating status of a firmware upgrade by the at least two eligible nearby nodes; and
transmitting, using master mode, the received status packet to the most recent node of the routing list as received.

3. The method of claim 1, wherein determining the at least two eligible nearby nodes includes determining eligibility by querying the at least two eligible nearby nodes regarding a current firmware version being used, wherein eligibility is based on whether the queried nodes are currently using a firmware version that is not yet upgraded relative to a version provided by the firmware upgrade request.

4. The method of claim 1, further comprising:
receiving a second status packet from one of the at least two eligible nearby nodes that was received by the one of the at least two eligible nearby nodes from a second other node of the network that is different than the node and the other node, the second status packet indicating status of the firmware upgrade by the second other node in response to receiving an upgrade request from the one of the at least two eligible nearby nodes; and
transmitting the received second status packet to the most recent node of the routing list as received.

5. The method of claim 1, further comprising:
storing, by the other node, a master list of unique identifiers for each node of the network to be provided with the upgrade request for performing the firmware upgrade as instructed in the upgrade request;
receiving, by the other node, status packets from each node that transmitted the upgrade request, the respective status packets indicating status of the firmware upgrade requested to be performed by the respective upgrade requests that were transmitted; and
updating, by the other node, the master list to reflect current status of the firmware upgrade for each of the unique identifiers based on the status packets received.

6. The method of claim 1, wherein in the event that transmitting the firmware upgrade request to the at least two eligible nearby nodes of the network by the node is unsuccessful after retrying a threshold number of times, the node transmits the status packet to the most recent node of the routing list as received to indicate that the firmware upgrade was unsuccessfully transmitted.

7. The method of claim 1, wherein the node communicates with the other node via a first piconet and the node communicates with the at least two eligible nearby nodes via a second piconet that is different than the first piconet.

8. The method of claim 1, wherein determining the at least two eligible nearby nodes includes:
detecting at least one nearby node that is capable of two-way wireless communication with the node;
storing the detected at least one nearby node in a target list; and
selecting nodes included in the target list that are eligible for the firmware upgrade based on a current upgrade status of the nodes included in the target list.

9. A node of a plurality of nodes of a wireless network, the node comprising:
a memory configured to store instructions;
a processor in communication with the memory, wherein the processor upon execution of the instructions is configured to:
receive using slave-mode, a firmware upgrade request from another node of the wireless network, wherein the firmware upgrade request received includes a routing list of nodes that transmitted the firmware upgrade request, including the other node as the most recent node to transmit the firmware upgrade request;
perform a firmware upgrade using upgrade instructions included with the firmware upgrade request;
determine by the node using master mode, at least two eligible nearby nodes of the wireless network;
update the firmware upgrade request to include the node adding identification of the other node to the routing list as the most recent node to transmit the firmware upgrade grade request;
transmit using master mode the firmware upgrade request as updated to the at least two eligible nearby nodes of the network;
each receiving node that receives the firmware upgrade request from a transmitting node comprising:
a second memory configured to store instructions;
a second processor in communication with the second memory, wherein the second processor upon execution of the instructions is configured to:
perform the firmware upgrade using the upgrade instructions in the firmware upgrade request;
determine using master mode, second eligible nearby nodes of the wireless network;
update the firmware upgrade request by adding identification of the receiving node to the routing list as the most recent transmitting node;

transmit using slave mode, to the most recent node of the routing list as received, a status packet that indicates status of the receiving node's firmware upgrade performed;
transmit using master mode, the firmware upgrade request to the second eligible nearby nodes;
receive using master mode, a status packet from each of the second eligible nearby nodes that indicates status of the firmware upgrade of the second eligible nearby nodes;
transmit using master mode, to the most recent node of the routing list as received, after performance of the firmware upgrade, the status packet received from each of the second eligible nearby nodes; and
upon receiving, via any of the second eligible nearby nodes, a status packet transmitted from one or more remote nodes to which the firmware upgrade request was previously transmitted by the at least two eligible nearby nodes that indicates status of a firmware upgrade by the one or more remote nodes, transmit, using master mode, the status packet received from the one or more remote nodes to the most recent node of the routing list as received.

10. The node of claim 9, wherein the firmware upgrade request received includes a routing list of nodes that transmitted the firmware upgrade request, including the other node as the most recent node to transmit the firmware upgrade request, and updating the firmware upgrade request includes the node adding identification of the node to the routing list as the most recent node to transmit the firmware upgrade request, wherein the processor when executing the instructions is configured to:
receive, using master mode, a status packet from the at least two eligible nearby nodes to which the firmware upgrade request was transmitted, the status packet indicating status of a firmware upgrade by the at least two eligible nearby nodes; and
transmit, using master mode, the received status packet to the most recent node of the routing list as received.

11. The node of claim 9, wherein determining the at least two eligible nearby nodes includes determining eligibility by querying the at least two eligible nearby nodes regarding a current firmware version being used, wherein eligibility is based on whether the queried nodes are currently using a firmware version that is not yet upgraded relative to a version provided by the firmware upgrade request.

12. The node of claim 9, wherein the processor when executing the instructions is configured to:
receive a second status packet from one of the at least two eligible nearby nodes that was received by the one of the at least two eligible nearby nodes from a second other node of the network that is different than the node and the other node, the second status packet indicating status of the firmware upgrade by the second other node in response to receiving a firmware upgrade request from the one of the at least two eligible nearby nodes; and
transmit the received second status packet to the most recent node of the routing list as received.

13. The node of claim 9, wherein the node communicates with the other node via a first piconet and second node communicates with the at least two eligible nearby nodes via a second piconet that is different than the first piconet.

14. Non-transitory computer readable storage mediums and one or more computer programs embedded therein associated with respective nodes of a plurality of nodes of a wireless network, the computer programs comprising instructions, which when executed by a computer system of a node of the plurality of nodes, cause the computer system to:
receive using slave-mode, a firmware upgrade request from another node of the wireless network, wherein the firmware upgrade request received includes a routing list of nodes that transmitted the firmware upgrade request, including the other node as the most recent node to transmit the firmware upgrade request;
perform a firmware upgrade using upgrade instructions included with the firmware upgrade request;
determine by the node using master mode, at least two eligible nearby nodes of the wireless network;
update the firmware upgrade request to include the node adding identification of the other node to the routing list as the most recent node to transmit the firmware upgrade grade request;
transmit using master mode the firmware upgrade request to the at least two eligible nearby nodes of the wireless network;
the computer programs when executed by a computer system of each receiving node of the wireless network that receives the firmware upgrade request from a transmitting node of the wireless network:
performing the firmware upgrade using the upgrade instructions in the firmware upgrade request;
determining using master mode, second eligible nearby nodes of the wireless network;
updating the firmware upgrade request by adding identification of the receiving node to the routing list as the most recent transmitting node;
transmitting using slave mode, to the most recent node of the routing list as received, a status packet that indicates status of the receiving node's firmware upgrade performed;
transmitting using master mode, the firmware upgrade request to the second eligible nearby nodes;
receiving using master mode, a status packet from each of the second eligible nearby nodes that indicates status of the firmware upgrade of the second eligible nearby nodes;
transmitting using master mode, to the most recent node of the routing list as received, after performance of the firmware upgrade, the status packet received from each of the second eligible nearby nodes; and
upon receiving, via any of the second eligible nearby nodes, a status packet transmitted from one or more remote nodes to which the firmware upgrade request was previously transmitted by the at least two eligible nearby nodes that indicates status of a firmware upgrade by the one or more remote nodes, transmitting, using master mode, the status packet received from the one or more remote nodes to the most recent node of the routing list as received.

15. The non-transitory computer readable storage medium of claim 14, wherein
the firmware upgrade request received includes a routing list of nodes that transmitted the firmware upgrade request, including the other node as the most recent node to transmit the firmware upgrade request, and updating the firmware upgrade request includes the node adding identification of the node to the routing list as the most recent node to transmit the firmware upgrade request, wherein the computer program instructions, when executed by the computer system, further cause the computer system to:

transmit, using slave mode, to the most recent node of the routing list as received, after performance of the firmware upgrade, a status packet that indicates status of the firmware upgrade performed.

16. The non-transitory computer readable storage medium of claim 14, wherein the firmware upgrade request received includes a routing list of nodes that transmitted the firmware upgrade request, including the other node as the most recent node to transmit the firmware upgrade request, and updating the firmware upgrade request includes the node adding identification of the node to the routing list as the most recent node to transmit the firmware upgrade request, wherein the computer program instructions, when executed by the computer system, further cause the computer system to:

receive, using master mode, a status packet from the at least two eligible nearby nodes to which the firmware upgrade request was transmitted, the status packet indicating status of a firmware upgrade by the at least two eligible nearby nodes; and transmit, using master mode, the received status packet to the most recent node of the routing list as received.

17. The non-transitory computer readable storage medium of claim 14, wherein the computer program instructions, when executed by the computer system, further cause the computer system to:

receive a second status packet from one of the at least two eligible nearby nodes that was received by the one of the at least two eligible nearby nodes from a second other node of the network that is different than the node and the other node, the second status packet indicating status of the firmware upgrade by the second other node in response to receiving a firmware upgrade request from the one of the at least two eligible nearby nodes; and transmit the received second status packet to the most recent node of the routing list as received.

* * * * *